US007924869B2

(12) United States Patent
Jinxia et al.

(10) Patent No.: US 7,924,869 B2
(45) Date of Patent: Apr. 12, 2011

(54) TIME-DIVISION-BASED CHANNEL COLLISION COLLABORATION IN A DYNAMIC FREQUENCY HOPPING WIRELESS REGIONAL AREA NETWORK (WRAN)

(75) Inventors: Cheng Jinxia, Beijing (CN); Hai Wang, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 144 days.

(21) Appl. No.: 12/344,712

(22) Filed: Dec. 29, 2008

(65) Prior Publication Data

US 2009/0168798 A1    Jul. 2, 2009

(30) Foreign Application Priority Data

Dec. 28, 2007   (CN) .......................... 2007 1 0307824

(51) Int. Cl.
*H04L 12/43* (2006.01)
(52) U.S. Cl. ........ 370/461; 370/431; 370/458; 455/450; 455/454
(58) Field of Classification Search .................. 370/310, 370/315, 319, 321, 345, 347, 431, 458, 461, 370/464, 478; 455/403, 422.1, 450, 454
See application file for complete search history.

(56) References Cited

U.S. PATENT DOCUMENTS

| 2004/0146017 | A1 | 7/2004 | Aoyama | |
| 2007/0104176 | A1* | 5/2007 | Ji et al. | 370/348 |
| 2007/0249341 | A1* | 10/2007 | Chu et al. | 455/434 |
| 2008/0090581 | A1* | 4/2008 | Hu | 455/452.1 |
| 2008/0096542 | A1* | 4/2008 | Chu et al. | 455/422.1 |
| 2008/0253341 | A1* | 10/2008 | Cordeiro et al. | 370/338 |
| 2009/0067354 | A1* | 3/2009 | Gao et al. | 370/310 |

FOREIGN PATENT DOCUMENTS

| JP | 07-212821 A | 8/1995 |
| KR | 10-2001-0063602 A | 7/2001 |
| KR | 10-2002-0078422 A | 10/2002 |

* cited by examiner

*Primary Examiner* — William Trost, IV
*Assistant Examiner* — Charles C Jiang
(74) *Attorney, Agent, or Firm* — Jefferson IP Law, LLP

(57) ABSTRACT

A method of and system for time-division-based channel collision collaboration in a wireless communication system including at least two Wireless Regional Area Networks (WRANs) with overlapping service areas that employ dynamic frequency hopping is provided. The method includes performing, by at least one Consumer Premise Equipment (CPE) located in an overlapping portion of service areas of at least two WRANs, spectrum sensing and feeding idle channel information back to respective Base Stations (BSs) of the at least two WRANs, broadcasting, by each of the at least two WRANs, a pre-occupation announcement message for a qualified idle channel, and determining, by a WRAN with the highest priority of the at least two WRANs, a time resource allocation for WRANs in a channel collision state of the at least two WRANs. The method addresses problems, such as a large delay and impaired wireless access due to an absence of an idle channel for adjacent WRANs, may be avoided, while the WRANs may maintain their QoSs. Therefore, transmission power of a WRAN during non-operation period may be conserved.

12 Claims, 8 Drawing Sheets

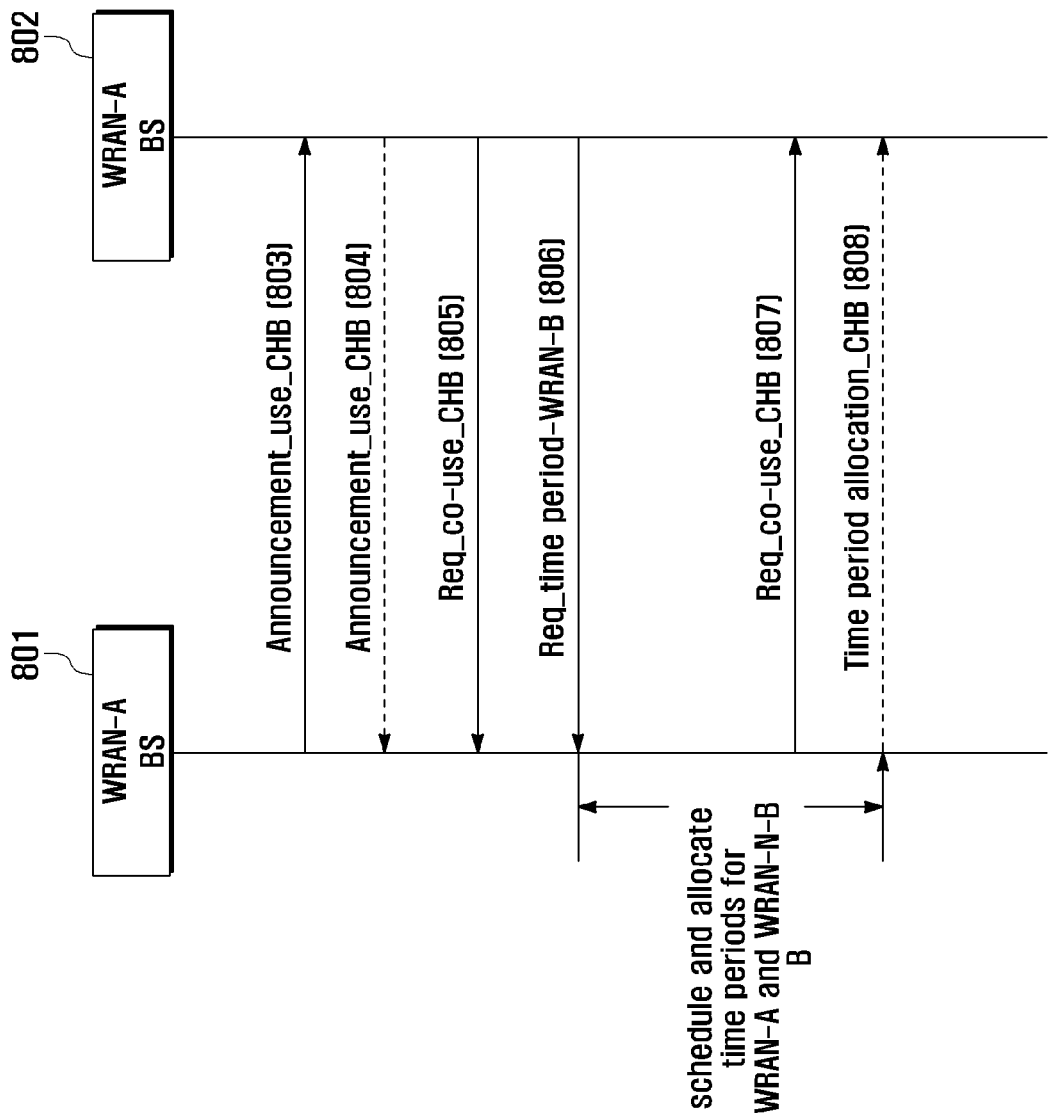

TIME-DIVISION-BASED CHANNEL COLLISION COLLABORATION IN A DYNAMIC FREQUENCY HOPPING WIRELESS REGIONAL AREA NETWORK (WRAN)

PRIORITY

This application claims the benefit under 35 U.S.C. §119(a) of a Chinese patent application filed on Dec. 28, 2007 in the State Intellectual Property Office of the People's Republic of China and assigned Serial No. 200710307824.3, the entire disclosure of which is hereby incorporated by reference.

BACKGROUND OF THE INVENTION

1. Field of the Invention

The present invention relates to wireless communication. More particularly, the present invention relates to spectrum collaboration between multiple overlapping Wireless Regional Area Networks (WRANs).

2. Description of Related Art

At present, in communication protocols, such as those defined in the Institute of Electrical and Electronics Engineers (IEEE) 802.22 standard, etc., no regulation or description is given on how to effectively address the problem of channel collision between two or more overlapping WRANs by using collaboration.

For a WRAN applying a cognitive radio technique, research is being conducted on how to better use limited idle frequency bands to implement area access communication.

When each Consumer Premise Equipment (CPE) in a WRAN performs in-band spectrum sensing, the access network spends a long period detecting frequency bands that are occupied by respective authorized users.

An example of conventional techniques are techniques defined in the IEEE P802.22/D0.2, Draft Standard for Wireless Regional Area Networks Part 22: Cognitive Wireless RAN Medium Access Control (MAC) and Physical Layer (PHY) specifications: Policies and procedures for operation in the TV Bands, November 2006, the entire disclosure of which is hereby incorporated by reference. In conventional techniques, a frequency hopping operation scheme is proposed for a WRAN based on dynamic frequency hopping. In the frequency hopping operation scheme, periodic frequency hopping between different idle channels is used to reduce the quiet period for in-band spectrum sensing. FIG. 1 illustrates a dynamic frequency hopping process of multiple WRANs according to the conventional art. More specifically, FIG. 1 illustrates flexible frequency hopping of WRAN-1 104 and WRAN-2 105 between CHannel (CH) A 101, CH B 102 and CH C 103. WRAN-1 104 operates in the first period of CH A 101. In the second operation period, WRAN-1 104 hops to the idle CH B 102 to establish communications. During the third operation period, WRAN-1 104 hops to the idle CH C 103. Similarly, WRAN-2 105 sequentially hops from CH C 103 to CH A 101 and then to CH B 102 during the three operation periods. Therefore, not only may WRAN-1 104 and WRAN-2 105 operate in idle channels, but also the CPEs may implement normal spectrum sensing during the quiet periods of the channels.

FIG. 2 illustrates a dynamic frequency hopping operation in a WRAN according to the conventional art. More specifically, FIG. 2 illustrates a process by which WRAN 201 operates during three periods, such as the initial spectrum sensing stage 202 and the two operation stages 203 and 204. Initially, the CPEs in WRAN 201 implement the initial spectrum sensing process 202 to detect the idle frequency band and the valid time 205 of CH A for the normal operation of the system. During the second operation period, WRAN 201 hops to CH A to transmit data and at the same time implements spectrum sensing 203 for CH ([0,A−n],[A+n,N]) to obtain the valid time 206 of CH B. During the third operation period, WRAN 201 hops to CH B and at the same time implements spectrum sensing 204 for CH ([0,B−n],[B+n,N]). Here, N denotes the total number of channels to be detected, and n denotes the width of a guard band.

The issue of how to address the spectrum collision between multiple WRANs using dynamic frequency hopping is being researched. In a conventional solution, the control center of WRAN-1 that has first detected the idle CH A announces, by transmitting signaling to other WRANs, that it has pre-occupied the detected idle channel, and at the same time the control center of WRAN-1 monitors the announcement broadcast information from the other WRANs. If there is no broadcast information on the pre-occupation of CH A, or a pre-occupation announcement from the other systems occurs later than the pre-occupation announcement of WRAN-1, then WRAN-1 hops to CH A in the next period. A scenario that occurs when the above described collision-avoiding-based solution is adopted to address the spectrum collision in WRANs is hereafter described with reference to FIG. 3. FIG. 3 illustrates channel collision between two overlapping WRANs according to the conventional art.

During the first operation period, WRAN-1 301 detects the valid time 303 of CH A and WRAN-2 302 detects the valid time 304 of CH D. Then WRAN-1 301 and WRAN-2 302 respectively hop to CH A and CH D during the second operation period. In the second operation period, the following two cases may occur:

(1) both WRAN-1 301 and WRAN-2 302 have only detected that CH B is in an idle state, and they have obtained different valid times, i.e., valid time 305 for CH B by WRAN-1 and valid time 306 for CH B by WRAN-2;

(2) only WRAN-1 301 detects that CH B is idle; meanwhile, WRAN-2 detects that CH B and CH C are idle. However, the valid time 307 for CH C exceeds a maximum delay limit of WRAN-2.

Accordingly, the collision-avoiding solution based on a contention mechanism is not adequate to address the above two cases of spectrum collision.

Among conventional techniques, a frequency-division-based spectrum collaboration method is proposed to address channel collision in the above two cases. However, this method has deficiencies. Since all WRANs participating in frequency collaboration are in an operational state, new problems may occur as follows:

(1) Significant bandwidth resources are spent in producing guard bands; especially in the case that the number of the participating WRANs increases, the Base Station (BS) transmission power increases and the overlapping areas among cells increase, therefore an increasing amount of spectrum resources have to be used to generate guard bands to address interferences between the cells;

(2) Since all WRANs are in operation during all operation periods, much more transmission power is wasted.

Therefore, a need exists for a method for spectrum collaboration between multiple overlapping WRANs.

SUMMARY OF THE INVENTION

An aspect of the present invention is to address at least the above mentioned problems and/or disadvantages and to provide at least the advantages described below. Accordingly, an aspect of the present invention is to provide a time-division-based channel collaboration method and system, which may effectively avoid channel collision between multiple overlapping Wireless Regional Area Networks (WRANs), so that the WRANs in the idle frequency bands may operate more efficiently.

In accordance with an aspect of the present invention, a method of time-division-based channel collision collaboration in a wireless communication system including at least two Wireless Regional Area Networks (WRANs) with overlapping service areas that employ dynamic frequency hopping is provided. The method includes performing, by at least one Consumer Premise Equipment (CPE) located in an overlapping portion of service areas of at least two WRANs, spectrum sensing and feeding idle channel information back to respective Base Stations (BSs) of the at least two WRANs, broadcasting, by each of the at least two WRANs, a pre-occupation announcement message for a qualified idle channel, and determining, by a WRAN with the highest priority of the at least two WRANs, a time resource allocation for WRANs in a channel collision state of the at least two WRANs.

In accordance with another aspect of the present invention, a system for time-division-based channel collision collaboration in a wireless communication system including at least two Wireless Regional Area Networks (WRANs) with overlapping service areas that employ dynamic frequency hopping is provided. The system includes at least one Consumer Premise Equipment (CPE) located in an overlapping portion of service areas of at least two WRANs for performing spectrum sensing and for feeding idle channel information back to respective Base Stations (BSs) of the at least two WRANs, the at least two WRANs for broadcasting a pre-occupation announcement message for at least one qualified idle channel and for determining, by a WRAN with the highest priority of the at least two WRANs, a time resource allocation for WRANs in a channel collision state of the at least two WRANs.

An aspect of the present invention is to address problems, such as a large delay and impaired wireless access due to an absence of an idle channel for adjacent WRANs, while the WRANs may maintain their QoSs. Therefore, the transmission power of a WRAN during non-operation period may be conserved.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 8 illustrates a control signaling between two overlapping WRAN Base Stations (BSs) according to an exemplary embodiment of the present invention.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
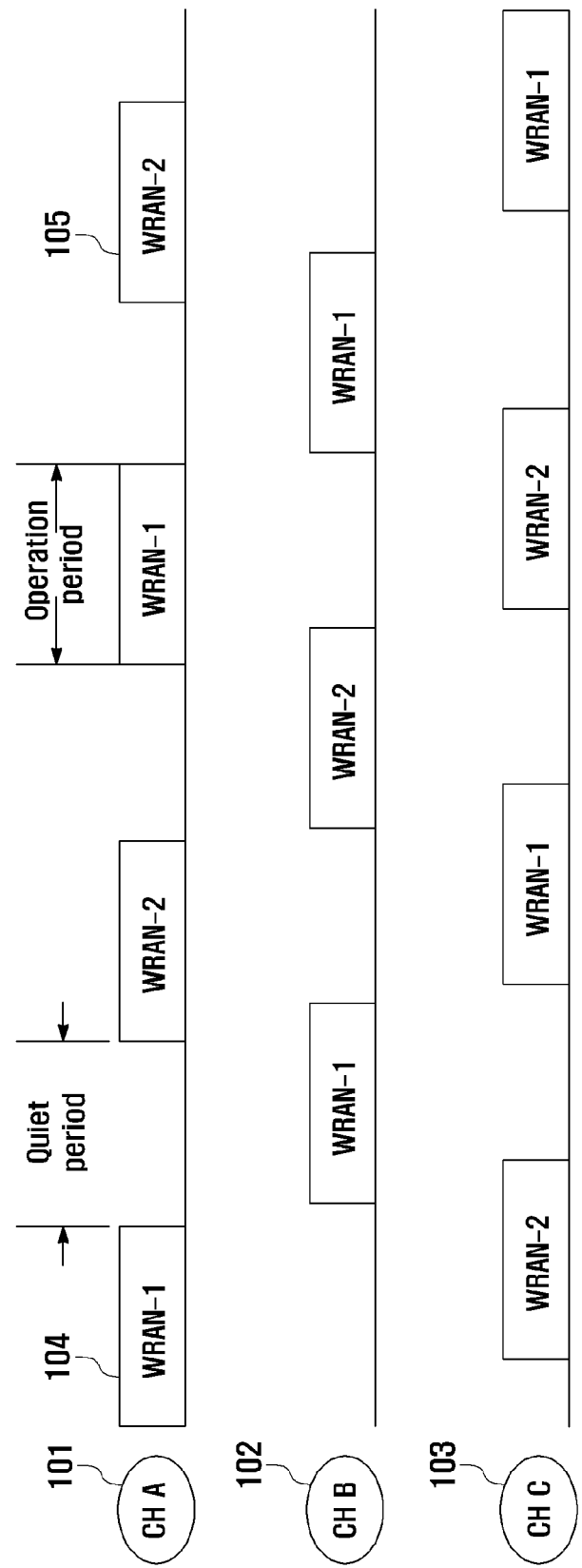
FIG. 1 illustrates a dynamic frequency hopping process of multiple Wireless Regional Area Networks (WRANs) according to the conventional art.
Figure 2:
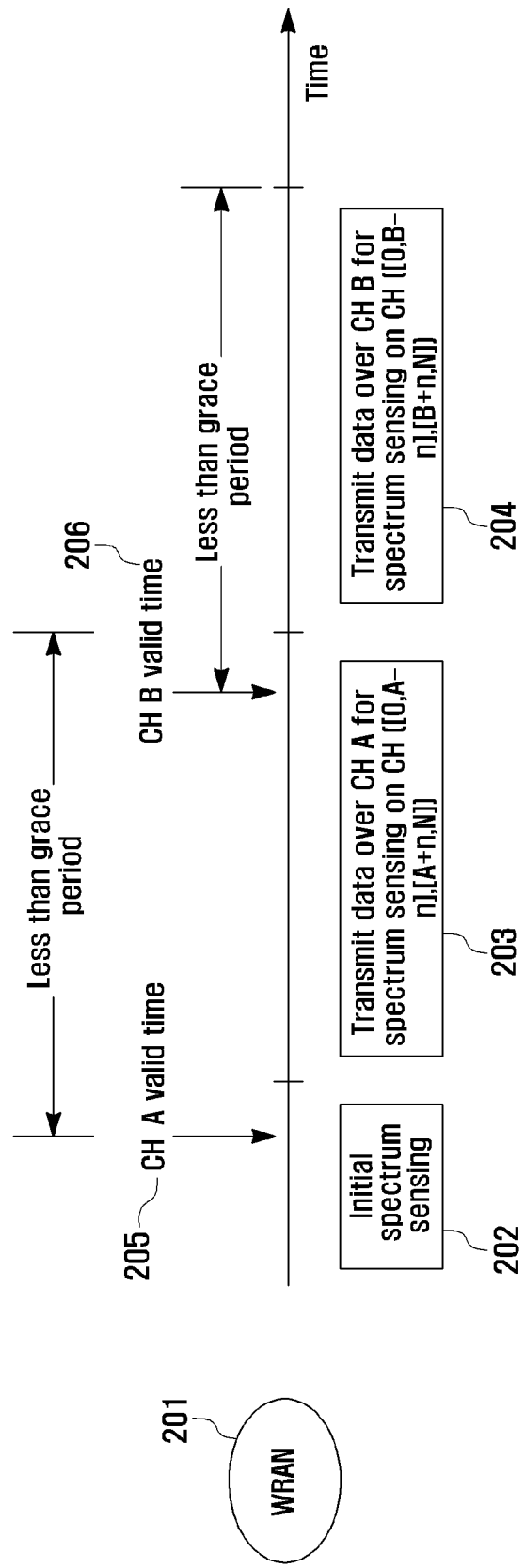
FIG. 2 illustrates a dynamic frequency hopping operation of a WRAN according to the conventional art.
Figure 3:
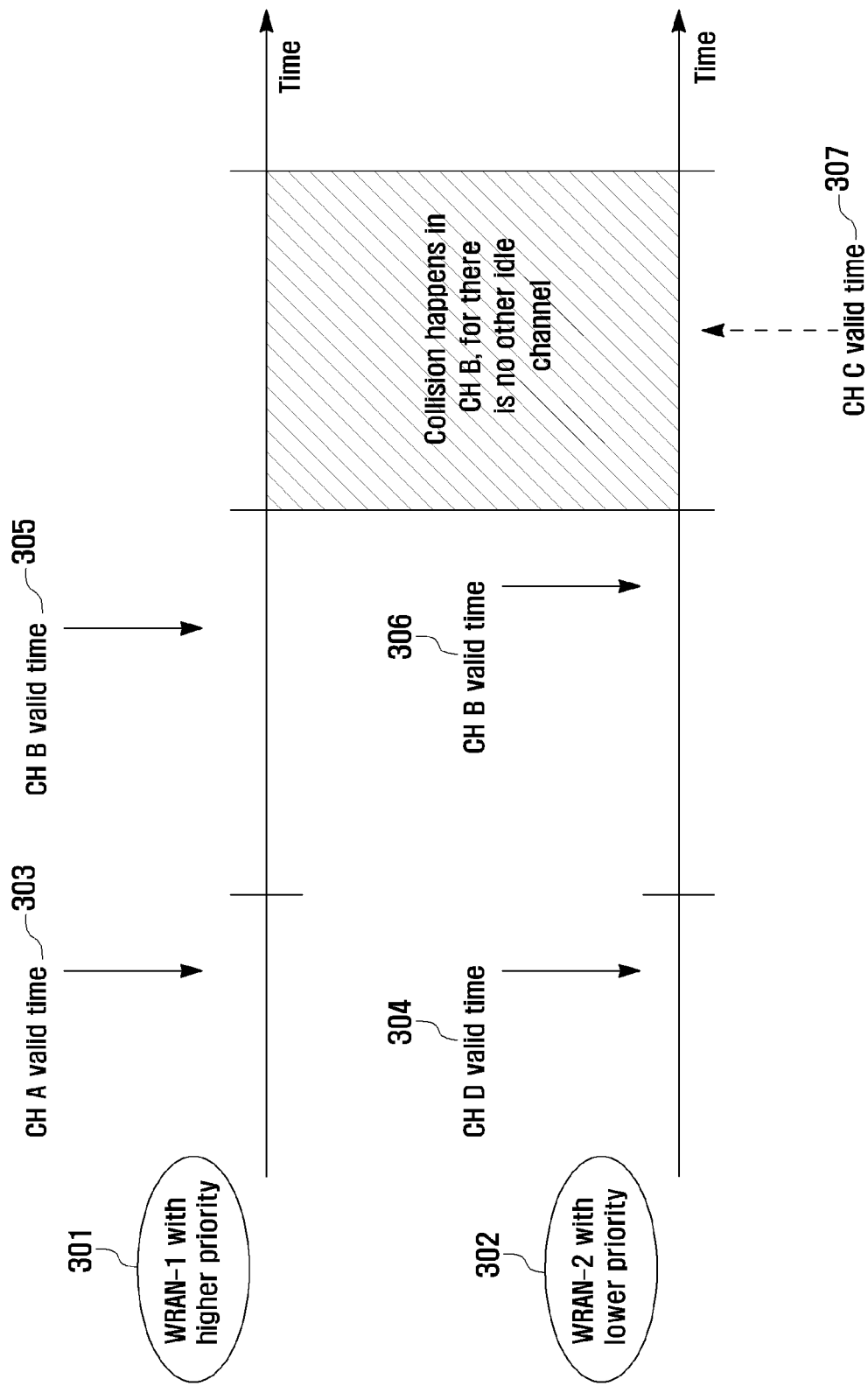
FIG. 3 illustrates channel collision between two overlapping WRANs according to the conventional art.
Figure 4:
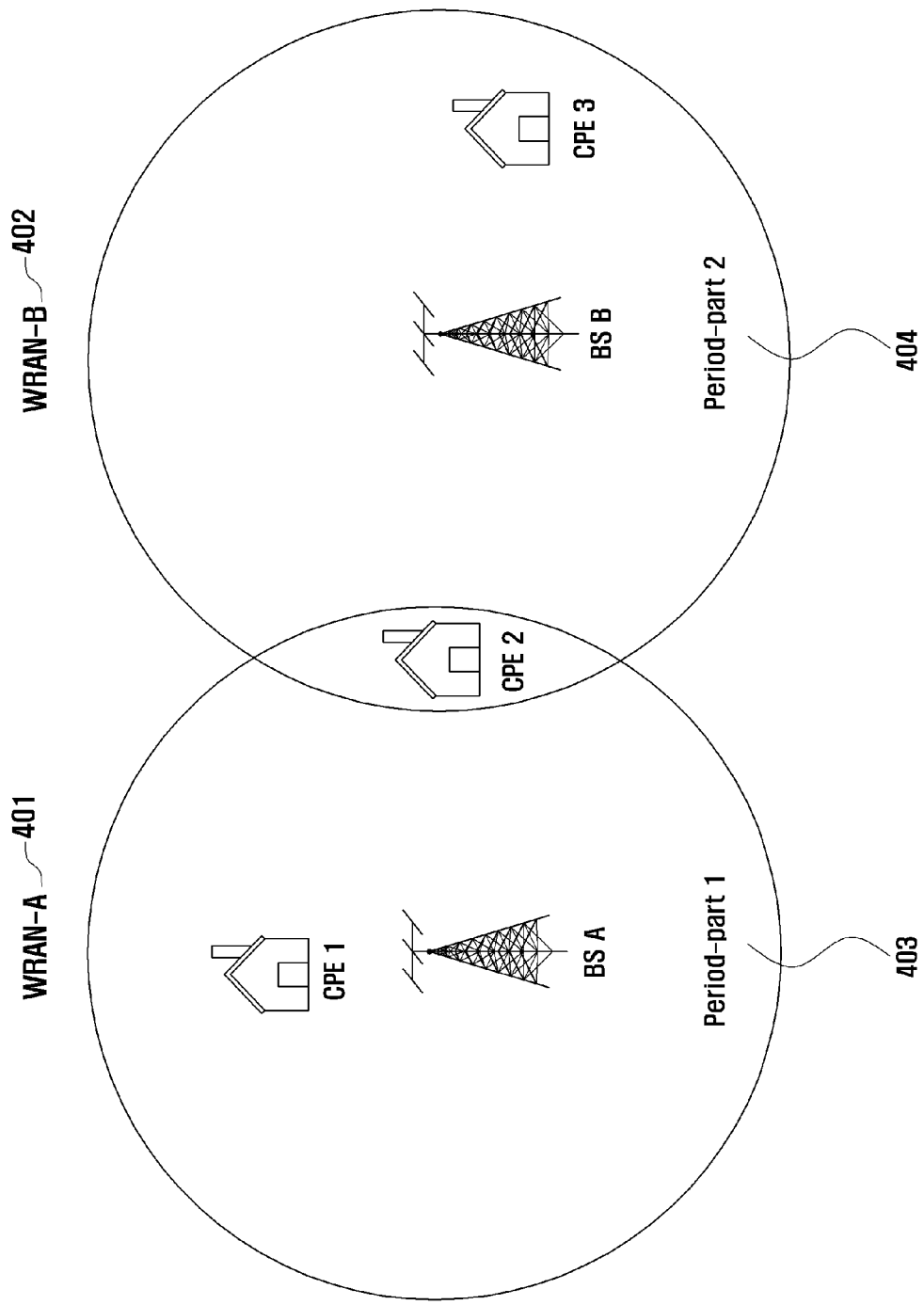
FIG. 4 illustrates a structure of overlapping WRANs according to an exemplary embodiment of the present invention.

FIG. 4 illustrates a structure of overlapping Wireless Regional Area Networks (WRANs) according to an exemplary embodiment of the present invention. Referring to FIG. 4, two overlapping WRANs including WRAN-A 401 and WRAN-B 402 are illustrated. WRAN-A 401 includes Base Station (BS) A having a service area within which Consumer Premise Equipment (CPE) 1 and CPE 2 are located. WRAN-B 402 includes BS B having a service area within which CPE 2 and CPE 3 are located. The service areas of WRAN-A 401 and WRAN-B 402 overlap and CPE 2 is located in the overlapping portion of the service areas. WRAN-A 401 implements spectrum sensing and selects idle CHannel B (CH B) as its target frequency band for frequency hopping during the next period. Meanwhile, WRAN-B 402 also implements spectrum sensing and selects idle CH B as its target frequency band for frequency hopping during the next period. Thereafter, spectrum collision occurs between WRAN-A 401 and WRAN-B 402.

Exemplary embodiments of the present invention enable band sharing of the idle CH B by two WRANs through signaling interaction between the control centers of the overlapping WRANs. A control center of a WRAN may be a BS or the like. Here, WRAN-A 401 occupies the entire channel but only operates during Period-Part 1 403 of the entire operation period and WRAN-B 402 occupies the entire channel but only operates during Period-part 2 404.

Figure 5:
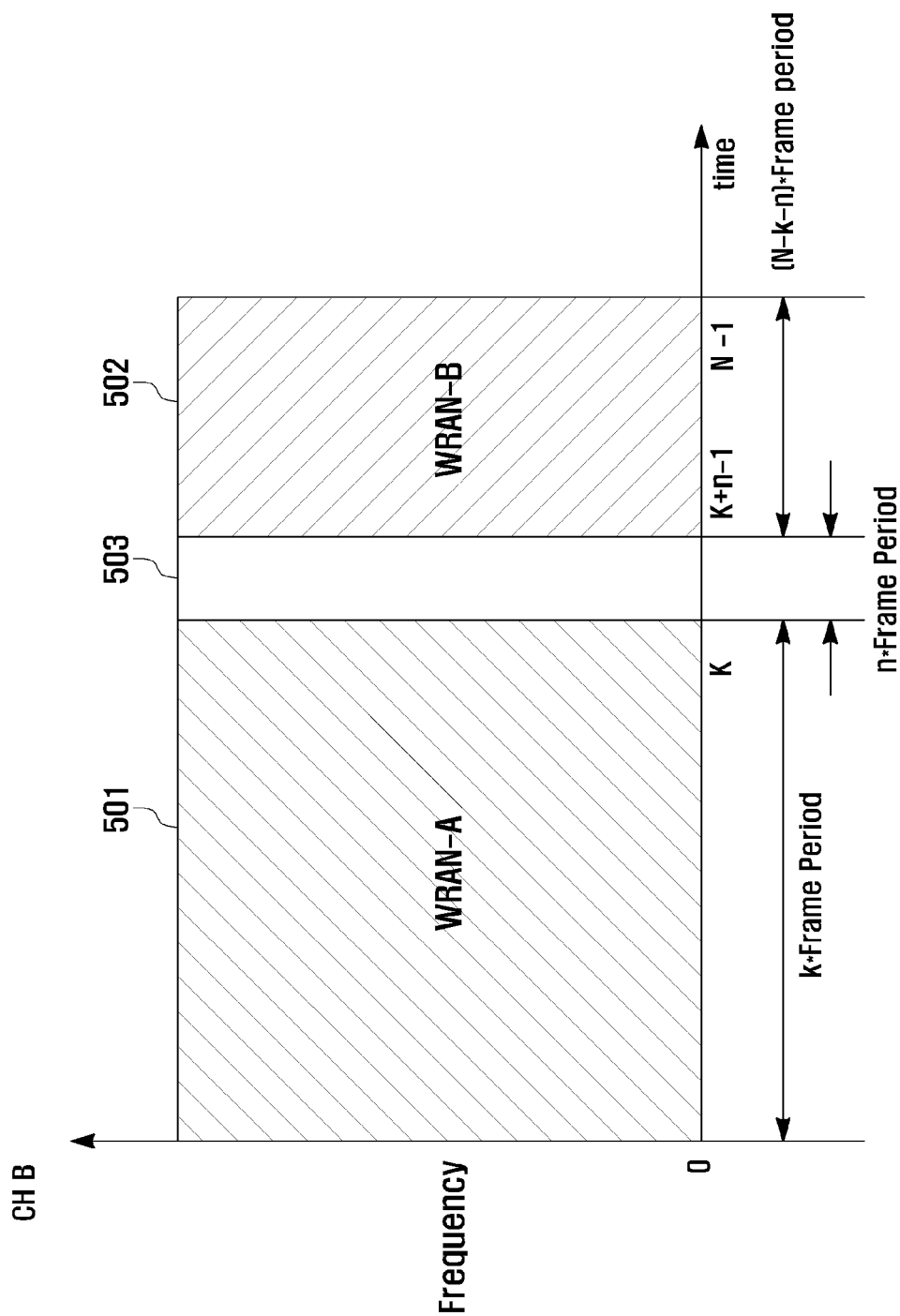
FIG. 5 illustrates a time period division algorithm for a method of time-division-based channel collaboration according to an exemplary embodiment of the present invention.

FIG. 5 illustrates a time period division algorithm for a method of time-division-based channel collaboration according to an exemplary embodiment of the present invention. More specifically, FIG. 5 illustrates the division and sharing of frequency resources between WRAN-A 501 and WRAN-B 502. In FIG. 5, the horizontal axes represents time and the vertical axis represents frequency. Referring to FIG. 5, the entire operation period T is divided into N time units 0, 1, . . . , N−1, as shown on the horizontal axis. Here, as an example, the time units are assumed to be a communication frame defined in the Institute of Electrical and Electronics Engineers (IEEE) 802.22 standard, in which a frame is defined as about 10 ms. However, the present invention is equally applicable with other time units. The time units [0,K] are allocated to WRAN-A 501. In addition, the sub-CHs [K+n−1,N−1] are allocated to WRAN-B 502. To avoid collision in data transmissions of the cells of the two overlapping WRANs, n time units are reserved as a Guard Period (GP) 503. Therefore, a valid time period for WRAN-A 501 is:

Time Period(WRAN-$A$)=$k$*Frame Period;

a valid time period for WRAN-B 502 is:

Time Period(WRAN-$B$)=($N$−$k$−$n$)*Frame Period; and the valid time period for GP 503 is:

Time Period($GB$)=$n$*Frame Period.

According to scenarios defined in the IEEE 802.22 standard, the typical maximum time period for holding a channel is about 30~35 s. In a Time Division Duplexing (TDD) mode, the GP between an uplink frame and a downlink frame is about 210 μs, and the GP between frames is about 46 μs. Thus, the value of the GP parameter n is relatively small compared to the channel holding time and therefore may be ignored. The time unit allocation parameter $^k$ is specified by the BS of the WRAN with the highest priority according to the time period request information sent from other WRAN BSs with lower priorities. Details on priority determination and the interaction of control signaling will be given below.

Figure 6:
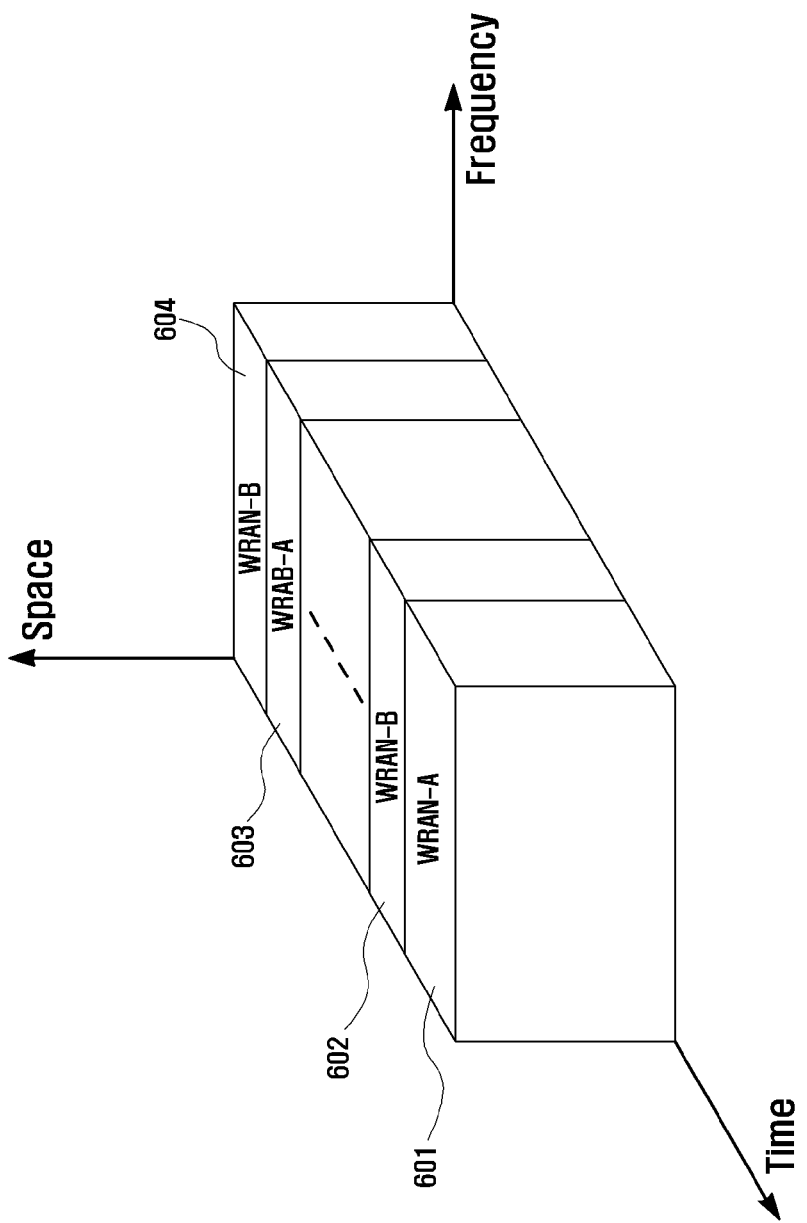
FIG. 6 is a schematic diagram of collision collaboration using a multiple time period division method according to an exemplary embodiment of the present invention.

If the operation period of each WRAN is relatively long, one or more WRAN(s) participating in collaboration always stay(s) in a halted state of data transmission and reception. This is contrary to an aspect of the present invention. To address this problem, a time unit allocation method based on multiple time period division is illustrated in FIG. 6. FIG. 6 is a schematic diagram of collision collaboration using a multiple time period division method according to an exemplary embodiment of the present invention. Referring to FIG. 6, it may be seen that the time periods 601 and 603 are allocated to the WRAN-A, and the time periods 602 and 604 are allocated to WRAN-B . In this discrete time period block allocation method, some time is sacrificed to avoid collisions between different cells, and some additional signaling overhead is used for initialization and random access. Therefore, the respective WRANs may carry out normal operations within a shorter waiting period. The particular granularity size of the time period is specified by the served user's Quality of Service (QoS) and the length of an operation period in the relevant cell.

Figure 7:
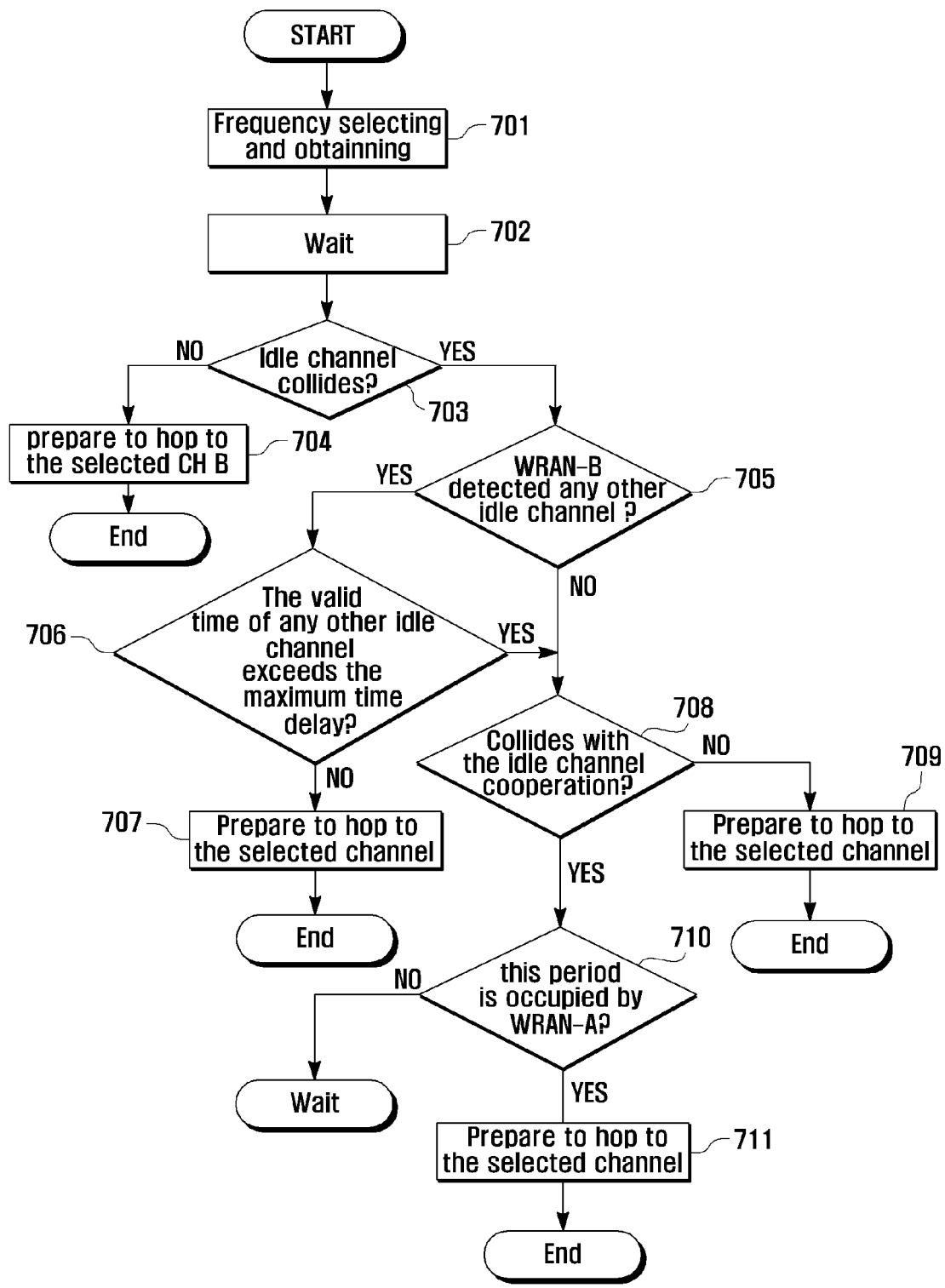
FIG. 7 illustrates a system operation flow according to an exemplary embodiment of the present invention.

FIG. 7 illustrates the system operation flow of an exemplary embodiment of the present invention.

In step 701, CPEs in one or more WRANs perform spectrum sensing and transmit the spectrum sensing results to the WRANs respectively, which then select an idle frequency band for the next frequency hopping period and thereafter transmit an Announcement_use message. In step 702, each WRAN monitors for broadcast information from surrounding WRANs in a waiting period. In step 703, each WRAN that has transmitted an Announcement_use message determines if there is an idle channel collision. An idle channel collision is determined by receiving an Announcement_use message from another WRAN. If there is not an idle channel collision in step 703, the WRAN hops to the selected idle channel in the next period in step 704. Thereafter, the process ends. Alternatively, if there is an idle channel collision in step 703, the WRAN determines if it has detected another idle channel in step 705. It is determined that the other WRAN has detected another idle channel if the other WRAN transmits Announcement_use messages for more than one idle channel. If the WRAN determines that the other WRAN has detected another idle channel in step 705, it determines if the valid time of any other idle channel exceeds the maximum time delay in step 706. If it is determined that the valid time of any other idle channel does not exceed the maximum time delay in step 706, the WRAN prepares to hop to the selected idle channel in step 707. Thereafter, the process ends. However, it is determined that the valid time of any other idle channel does exceed the maximum time delay in step 706 or that the other WRAN has not detected another idle channel in step 705, the process proceeds to step 708. In step 708, the WRAN determines if the collision is with an idle channel in cooperation. If the WRAN determines that the collision is not with an idle channel in cooperation in step 708, the WRAN prepares to hop to the selected idle channel in step 709. Thereafter, the process ends. If the WRAN determines that the collision is with an idle channel in cooperation in step 708, the WRAN determines if the collision is in a period occupied by another WRAN in step 710. If the WRAN determines that the collision is not in a period occupied by another WRAN in step 710, the WRAN waits. Otherwise, if the WRAN determines that the collision is in a period occupied by another WRAN in step 710, the WRAN prepares to hop to the selected idle channel in step 711. Thereafter, the process ends.

FIG. 8 illustrates the control signaling between WRANs of an exemplary embodiment of the present invention.

Referring to FIG. 8, WRANs of an exemplary embodiment of the present invention operate as follows.

CPEs in WRAN-A and WRAN-B each perform spectrum sensing and transmit the spectrum sensing results to each corresponding BS, which decides the idle frequency band for the next frequency hopping period.

WRAN-A BS 801 and WRAN-B BS 802 each broadcast Announcement_use_CH B 803 and 804 to the surrounding WRANs. Meanwhile, WRAN-A BS 801 and WRAN-B BS 802 monitor the broadcast information from the surrounding WRANs. For the purpose of explanation, it will be assumed that WRAN-A BS 801 first detects the idle CH B before WRAN-B BS 802, and thus broadcasts the announcement signal earlier than WRAN-B BS 802. Therefore, WRAN-A has higher priority.

If WRAN-A BS 801 receives no Announcement_use_CH B 803 information from any of the surrounding WRANs during the waiting period, it dynamically hops to CH B in the next period to transmit and receive data. If WRAN-A BS 801 receives Announcement_use_CH B 804 and Announcement_use_CH C information transmitted from WRAN-B BS 802 to the surrounding WRANs during the waiting period, WRAN-A BS 801 still dynamically hops to CH B in the next period to transmit and receive data. If WRAN-A BS 801 only receives Announcement_use_CH B 804 information transmitted from WRAN-B BS 802 to the surrounding WRANs during the waiting period, and the time stamp of the announcement information is later than that of WRAN-A, then WRAN-A has a higher priority.

WRAN-B BS 802 transmits request information Req_co-use_CH B 805 and bandwidth request information Req_Bandwidth_WRAN-B 806 to WRAN-A BS 801.

After receiving the request information Req_co-use_CH B 805 from WRAN-B BS 802, WRAN-A BS 801 determines whether to share CH B according to the Req_Bandwidth_WRAN-B 806 and its own QoS requirements.

WRAN-A BS 801 transmits response information Rep_co-use-CH B 807 for channel sharing to indicate whether to share CH B.

If WRAN-A agrees to share CH B with WRAN-B, the WRAN-A BS 801 schedules and allocates different time periods to WRAN-A and WRAN-B, and transmits time period control information Time period allocation_CH B 808 to the WRAN-B BS 802.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of time-division-based channel collision collaboration in a wireless communication system including at least two Wireless Regional Area Networks (WRANs) with overlapping service areas that employ dynamic frequency hopping, the method comprising:
    performing, by at least one Consumer Premise Equipment (CPE) located in an overlapping portion of service areas of at least two WRANs, spectrum sensing and feeding idle channel information back to respective Base Stations (BSs) of the at least two WRANs;
    broadcasting, by each of the BSs of the at least two WRANs, a pre-occupation announcement message for a qualified idle channel for a next operation time period;
    receiving, by a BS of a WRAN with a highest priority of a plurality of the at least two WRANs in a channel collision state, bandwidth request information from at least one other of the plurality of WRANs in a channel collision state; and
    determining, by the BS of the WRAN with the highest priority, a time resource allocation in the next operation time period on the qualified idle channel for the WRAN with the highest priority and at least one other of the plurality of WRANs in the channel collision state according to a Quality of Service (QoS) requirement of the BS of the WRAN with the highest priority.

2. The method of claim 1, wherein the qualified idle channel comprises a channel that is not to be occupied by any authorized subscriber in the next period for the at least two WRANs and whose valid time is within a maximum allowable delay range specified for the respective at least two WRANs.

3. The method of claim 1, wherein the WRAN with the highest priority comprises a WRAN whose corresponding BS first broadcasts the pre-occupation announcement message for the qualified idle channel for the next operation time period.

4. The method of claim 1, wherein the time resource allocation comprises an allocation and scheduling for the next operation time period on the qualified idle channel of a time period occupied by the WRAN with the highest priority and the at least one other of the plurality of WRANs in the channel collision state.

5. The method of claim 4, wherein the time period comprises a length of an overall valid time allocated to the respective WRAN in the channel collision state.

6. The method of claim 5, wherein the length of the time period for each of the WRANs in the channel collision state is decided by factors including at least one of the valid time of the qualified idle channel and a QoS requirement of the respective WRAN.

7. A system for time-division-based channel collision collaboration in a wireless communication system including at least two Wireless Regional Area Networks (WRANs) with overlapping service areas that employ dynamic frequency hopping, the system comprising:
    at least one Consumer Premise Equipment (CPE) located in an overlapping portion of service areas of at least two WRANs for performing spectrum sensing and for feeding idle channel information back to respective Base Stations (BSs) of the at least two WRANs; and
    the BSs of the at least two WRANs for broadcasting a pre-occupation announcement message for at least one qualified idle channel for a next operation time period, for receiving, by a BS of a WRAN with a highest priority of a plurality of the at least two WRANs in a channel collision state, bandwidth request information from at least one other of the plurality of WRANs in the channel collision state, and for determining, by the BS of the WRAN with the highest priority of a plurality of the at least two WRANs, a time resource allocation in the next operation time period on the qualified idle channel for the WRAN with the highest priority and at least one other of the plurality of WRANs in a channel collision state according to a Quality of Service (QoS) requirement of the BS of the WRAN with the highest priority.

8. The system of claim 7, wherein the qualified idle channel comprises a channel that is not to be occupied by any authorized subscriber in the next period for the at least two WRANs and whose valid time is within a maximum allowable delay range specified for the respective at least two WRANs.

9. The system of claim 7, wherein the WRAN with the highest priority comprises a WRAN whose corresponding BS first broadcasts the pre-occupation announcement message for the qualified idle channel for the next operation time period.

10. The system of claim 7, wherein the time resource allocation comprises an allocation and scheduling for the next operation time period on the qualified idle channel of a time period occupied by the WRAN with the highest priority and the at least one other of the plurality of WRANs in the channel collision state.

11. The system of claim 10, wherein the time period comprises a length of an overall valid time allocated to the respective WRAN in the channel collision state.

12. The system of claim 11, wherein the length of the time period for each of the WRANs in the channel collision state is decided by factors including at least one of the valid time of the qualified idle channel and a QoS requirement of the respective WRAN.

* * * * *